United States Patent [19]
Emerson

[11] 3,924,903
[45] Dec. 9, 1975

[54] DUAL SLOPE RAMP CIRCUIT FOR ANTI-SKID CONTROL CIRCUITRY

[75] Inventor: Lucian F. Emerson, Williamsport, Pa.

[73] Assignee: GTE Sylvania Incorporated, Stamford, Conn.

[22] Filed: May 6, 1974

[21] Appl. No.: 467,273

[52] U.S. Cl. .............................. 303/21 BE; 303/20
[51] Int. Cl.² ............................................ B60T 8/08
[58] Field of Search ....... 188/181; 235/183; 303/20, 303/21; 307/109, 228, 263; 317/5; 320/1; 324/161–162; 328/127, 151, 181, 185; 340/53, 62, 262–263

[56] References Cited
UNITED STATES PATENTS

| | | | |
|---|---|---|---|
| 3,578,819 | 5/1971 | Atkins | 188/181 A X |
| 3,643,113 | 2/1972 | Brock et al. | 328/127 X |
| 3,650,575 | 2/1972 | Okamoto | 303/20 X |
| 3,654,444 | 4/1972 | Gurol | 328/151 X |
| 3,744,855 | 7/1973 | Ochiai | 303/21 BE |
| 3,768,872 | 10/1973 | Urban et al. | 303/21 BE |
| 3,819,237 | 6/1974 | Marovby | 303/21 BE |
| 3,832,008 | 8/1974 | Leiber et al. | 303/21 BE |

*Primary Examiner*—George E. A. Halvosa
*Assistant Examiner*—Stephen G. Kunin
*Attorney, Agent, or Firm*—Norman J. O'Malley; Thomas H. Buffton; Robert T. Orner

[57] ABSTRACT

A regulator responsive to potentials representative of wheel speed is utilized to control the energy flow from a potential source to a passive integrator circuit which, in turn, controls the slope of a ramp potential applied to the brake control of an anti-skid circuit. The slope of the ramp signal is alterable by a switch responsive to external logic information available in anti-skid control circuits.

5 Claims, 3 Drawing Figures

DUAL SLOPE RAMP CIRCUIT FOR ANTI-SKID CONTROL CIRCUITRY

BACKGROUND OF THE INVENTION

This invention relates to anti-skid control circuitry for wheeled vehicles and more particularly to dual slope ramp circuitry suitable to anti-skid control circuits.

One known form of prior art circuitry for developing a dual ramp slope employs a charging capacitor coupled to a pair of voltage sources. The voltage sources each provide a potential representative of the wheel speed of a wheeled vehicle. The charging capacitor is also coupled to a pair of resistors each of which is associated with a transistor coupled to a source of logic information. Thus, the capacitor and one or both of the resistor-transistor circuits form a passive integrator circuit for developing a ramp signal.

The ramp signal developed by the above-mentioned apparatus is applied to a comparator which also receives a potential representative of the average of the pair of wheels. The comparator provides output logic information whereby a brake control system for the vehicle is activated.

In operation, the charging capacitor is energized from one of the voltage sources representative of wheel speed of the vehicle. The capacitor, in conjunction with one or the other of the resistor-transistor circuits, provides a ramp signal of a given slope of the comparator. In turn, the comparator responds to the applied ramp potential and to a potential representative of the average speed of the pair of wheels to alter the brake control circuit of the vehicle. Moreover, the developed ramp signal has a slope which is determined in accordance with received logic information whereby one of the two resistor-transistor circuits is employed.

Although the above-described dual slope ramp circuit has been utilized in numerous applications, it has been found that the circuitry does leave something to be desired in some applications. For example, it has been found that unmatched transistors in an open loop configuration, such as previously described, undesirably tend to drift at different rates due to temperature change. Also, manufacturing tolerances for transistors tend to exceed the desirable limits whereupon the developed ramp signals have slopes which are difficult, if not impossible, to control or anticipate. Moreover, the energy applied to the charging capacitor of such circuitry is derived directly from the potentials representative of the wheel speed which undesirably tends to have a deleterious effect upon the consistency of results.

OBJECTS AND SUMMARY OF THE INVENTION

An object of the present invention is to provide an enhanced anti-skid control circuit for a wheeled vehicle. Another object of the invention is to provide an improved dual slope ramp circuit for a vehicular anti-skid control circuit. Still another object of the invention is to provide an improved dual slope ramp circuit utilizing a regulator for controlling the energy applied to a passive integrator circuit. A further object of the invention is to provide an enhanced dual slope ramp circuit having a regulator whereby the initial and final potentials of a ramp signal are maintained substantially equal to a potential representative of the highest wheel speed of a vehicle.

These and other objects, advantages and capabilities are achieved in one aspect of the invention by a dual slope ramp circuit having a passive integrator coupled to a potential source and to a comparator with a potential regulator responsive to the wheel speed of a vehicle controlling the energy applied to the integrator from the potential source whereby the brake control of the vehicle is altered. Moreover, a switching means alters the passive integrator which varies the slope of the ramp signal in accordance with logic information derived from the vehicle operation.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
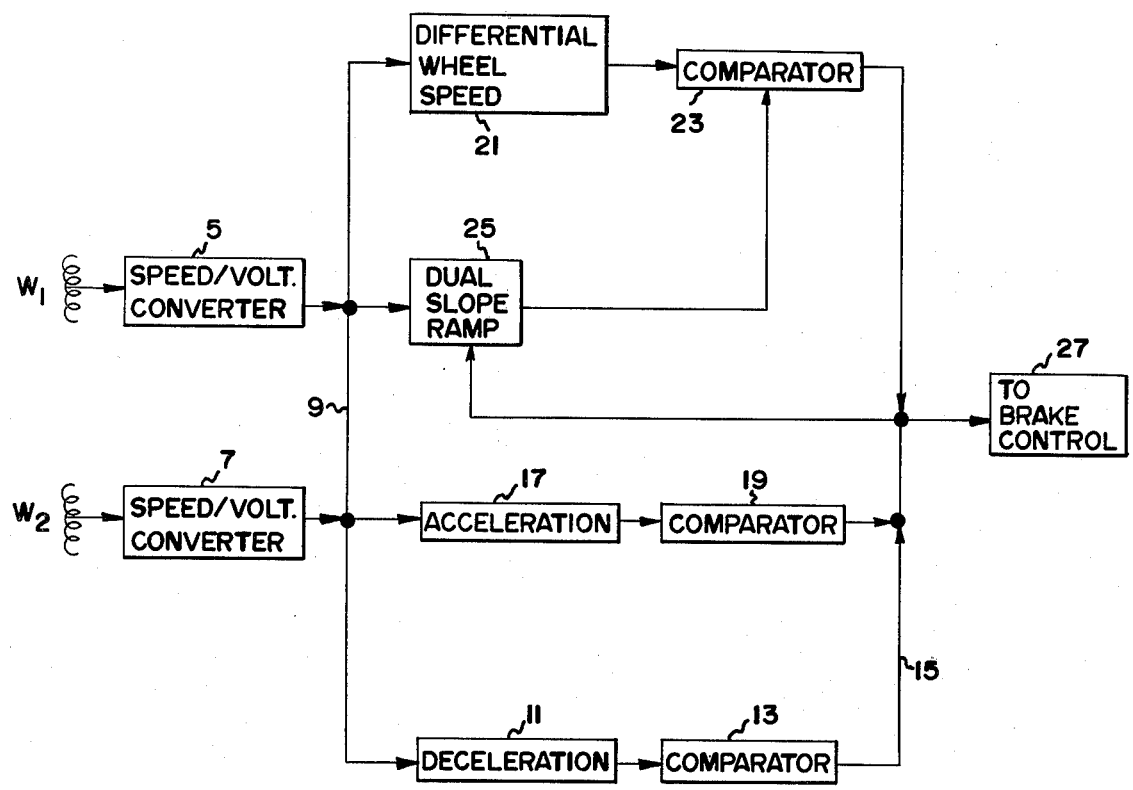
FIG. 1 is a schematic illustration, in block form, of an anti-skid control system.

In the drawings, FIG. 1 illustrates a partial anti-skid control system for a wheeled vehicle. Herein, signals representative of first and second wheel speeds $W_1$ and $W_2$ are applied to first and second speed to voltage converters, 5 and 7 respectively. The speed to voltage converters, 5 and 7, provide output potentials, representative of the wheel speeds $W_1$ and $W_2$, which are applied to a speed voltage analog rail 9.

The speed voltage analog rail 9 is coupled to a deceleration means 11 wherein signals representative of vehicular deceleration are developed and coupled by way of a comparator 13 to a logic rail 15. The speed voltage analog rail 9 is also coupled to an acceleration means 17 wherein signals representative of vehicular acceleration are developed and applied via a comparator 19 to the logic rail 15.

Further, the speed voltage analog rail 9 is coupled to a differential wheel speed means 21 wherein signals representing the average of the summed wheel speeds $W_1$ and $W_2$ are derived. This derived differential wheel speed signal is coupled to a comparator 23 connected to the logic rail 15.

The speed voltage analog rail 9 is also connected to a dual slope ramp circuit means 25. The dual slope ramp circuit means 25 responds to the highest one of the wheel speed potentials from the speed to voltage converters 5 and 7 and provides a pseudo-vehicular speed ramp signal to the comparator 23. Therein, the pseudo-vehicular speed ramp signals and differential wheel speed signals are compared and an output is provided to the logic rail 15 and ultimately to the brake control means 27 for altering the vehicular motion. Moreover, signals available at the logic rail 15 are coupled back to the dual slope ramp circuit means 25 to effect control of the slope of the ramp signal available therefrom as will be explained hereinafter.

Figure 2:
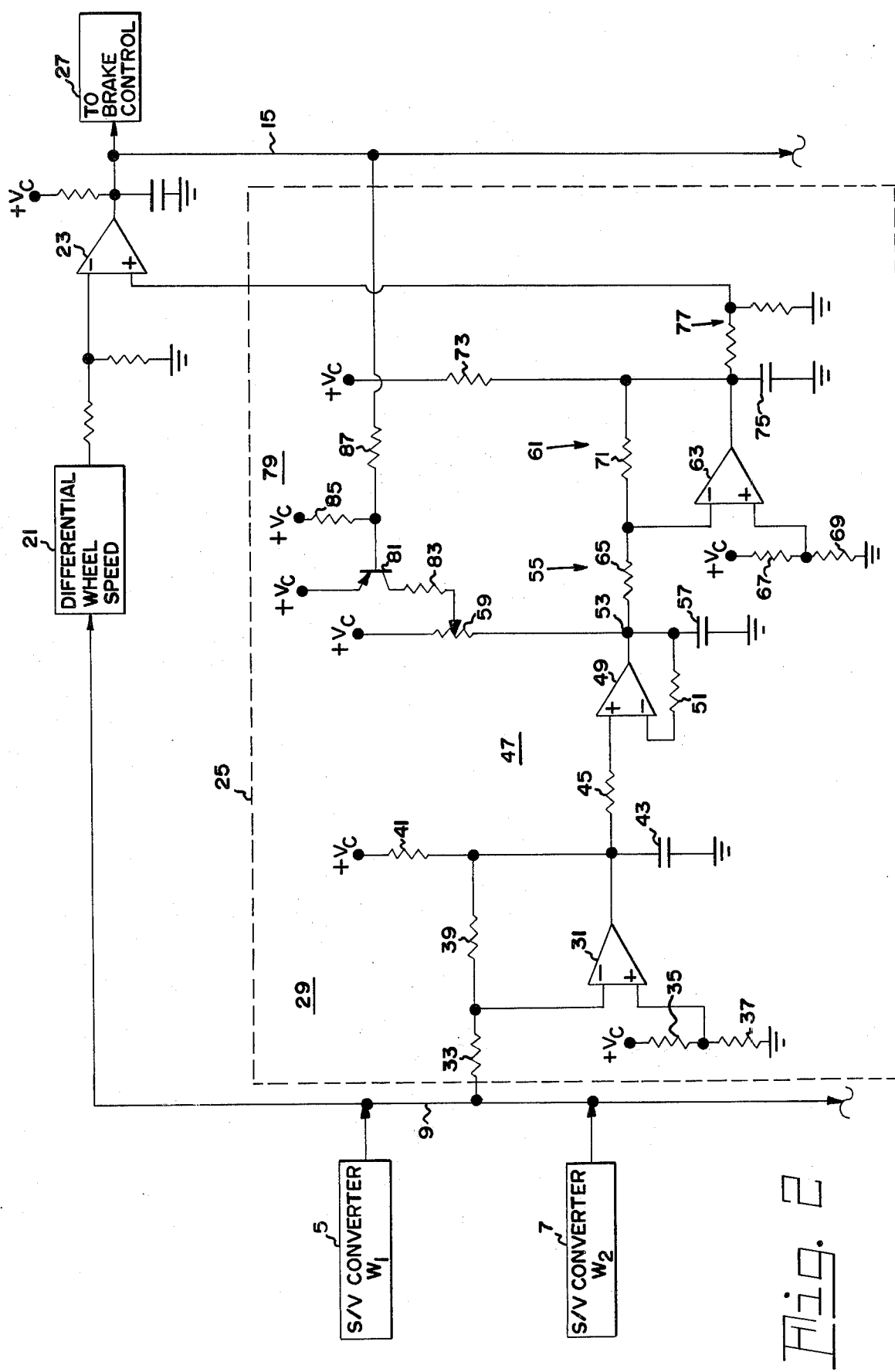
FIG. 2 is a block and schematic illustration of a preferred form of dual slope ramp circuitry.

As to the dual slope ramp circuit means 25, FIG. 2 illustrates a preferred embodiment. Herein, a pair of speed to voltage converters 5 and 7 apply potentials representative of first and second wheel speeds $W_1$ and $W_2$ to a speed voltage analog rail 9. The speed voltage analog rail 9 applies an average of the summed wheel speeds, multiplied by a constant, to the differential wheel speed means 21. Specifically the signal applied to the differential wheel speed means 21 may be represented as:

$$DWS = \left(\frac{Vh1 + Vh2}{2}\right) K$$

where: $Vh1$ and $Vh2$ are voltages representative of wheel speeds; $K$ is a constant normally greater than 1; and $DWS$ is the differential wheel speed.

Also, a potential representative of the highest wheel speed, available at the speed voltage analog rail 9, is applied to the dual slope ramp circuit 25. Herein, a DC amplifier and inverter stage 29, illustrated as a comparator 31, has an inverter terminal coupled by a resistor 33 to the speed voltage analog rail 9. The non-inverting terminal of the comparator 31 is connected to the junction of a pair of resistors 35 and 37 series connected intermediate a potential source +Vc and circuit ground. The output of the comparator 31 is coupled by a resistor 39 to the inverter terminal and to the junction of a resistor 41 and capacitor 43 series coupling a potential source +Vc to circuit ground.

The output of the DC amplifier and inverter stage 29 is coupled by a resistor 45 to a regulator or control circuit 47. The regulator circuit 47 includes a comparator 49 wherein the non-inverting terminal is coupled by the resistor 45 to the DC amplifier and inverter stage 29. Also, the output of the comparator 49 is fed back via a resistor 51 to the non-inverting terminal of the comparator 49.

The output of the comparator 49 is coupled to a junction 53 of a passive integrator circuit means 55. The passive integrator circuit means 55 includes a charge capacitor 57 coupling the junction 53 to circuit ground and a resistor 59 coupling the junction 53 to a potential source +Vc.

The output of the passive integrator circuit 55, available at the junction 53, is coupled to a potential inverting means 61. The potential inverting means 61 includes a comparator 63 having an inverter terminal coupled by a resistor 65 to the junction 53. A non-inverting terminal of the comparator 63 is connected to the junction of resistors 67 and 69 series coupling a potential source +Vc to circuit ground. The output of the comparator 63 is fed back to the invereter terminal via a resistor 71 and to the junction of a resistor 73 and capacitor 75 series connected intermediate a potential source +Vc and ground. The output of the comparator 63 is also connected via a voltage divider 77 to the non-inverting terminal of the comparator 23 coupling the differential wheel speed means 21 to the logic rail 15 and brake control means 27.

Further, a switching means 79 includes a transistor 81 having an emitter coupled to a potential source +Vc, a collector coupled by a resistor 83 to the passive integrator circuit 55, and a base coupled by a resistor 85 to a potential source +Vc and by a resistor 87 to the logic rail 15. Thus, the switching means 79 is responsive to logic information available from the logic rail 15 for altering the time constant of the passive integrator circuit 55.

As to operation, the first and second speed to voltage converters 5 and 7 serve as first and second voltage sources and provides potentials representative of first and second wheel speeds. The sum of the potentials provided by both first and second voltage converters 5 and 7 is averaged, and multiplied by a constant in the differential wheel speed means 21.

Also, a potential representative of the highest wheel speed derived from one of the speed to voltage converters 5 and 7 and available at the speed voltage rail 9 is applied to the inverter stage 29 of the dual slope ramp circuit 25. The inverter stage 29 has a comparator 31 with non-inverting terminal (+) coupled to a bias supply and the inverting terminal (−) coupled to the speed voltage rail 9.

When a decreasing speed voltage analog is presented at the speed voltage rail 9 the inverter stage 29 conditions the speed voltage analog signal available from the speed voltage rail 9 and produces an increasing voltage at the junction of resistors 41 and 45 and capacitor 43.

The inverted voltage representative of the wheel speed and available at the junction of the resistors 41 and 45 and capacitor 43 is coupled through the resistor 45 in the correct sense or polarity to allow the regulator circuit 47 or slope integrating stage to produce a positive-going ramp signal in response to a decreasing speed voltage signal at the speed voltage rail 9.

Assuming that the transistor 81 of the switching means 79 and the comparator 49 of the regulator circuit 47 are in a nonconductive mode, the resistor 59, capacitor 57 and potential source Vc of the passive integrator circuit means 55 determines the ramp voltage available at the terminal 53. Moreover, the parameters of the above-mentioned passive integrator circuit means 55 are inter-related by the following equation:

$$e_r(t) = V_c (1 - E^{-t/RC})$$

wherein:
  $R = R59$
  $C = C57$
with conditions:
  $t = 0$ and $t = RC$.

Therefore, the value of the ramp voltage when time is equal to the time constant or RC value is the upper limit of the value of $e_r$ as a function of time. Moreover, the values of the resistor 59, capacitor 57 and potential source Vc are selected such that the upper limit of the linear range of the ramp potential coincides with the maximum wheel speed range.

The wheel speed analog voltage available at the speed voltage rail 9 and applied via the inverter stage 29 controls the initial and final values of the ramp voltage available at the junction 53 by way of the resistor 45, comparator 49, and feed back resistor 51. Comparator 49 is a regulating comparator and receives a sensing speed voltage signal via the resistor 45 as well as a ramp voltage signal from the junction 53 via the feedback resistor 51. The comparator 49 compares the ramp voltage signal and speed analog voltage signal and regulates the initial and final values of voltage such that these voltage values are accurately related.

The voltage available at the junction 53 is derived from the energy provided by the current flow from the potential source Vc into the capacitor 57 via the resistor 59. The regulator comparator 49 will tend to act as an open switch coupled to the junction 53 so long as the voltage at the junction 53 is less than the output voltage from the inverter stage 29. When the voltage at the junction 53 exceeds the voltage at the output of the comparator 31 of the inverter stage 29, the regulator comparator 49 functions as a closed switch short-circuiting the junction 53 to circuit ground. Moreover, when the regulator comparator 49 is functioning as a closed switch, current flowing into the capacitor 57 is diverted to circuit ground and the voltage at the junction 53 will decay through the resistor 65.

Thus, the regulator comparator 49 functions as a high speed switch which can correct the voltage appearing at the junction 53. This regulator comparator 49 tends to maintain the voltage appearing at the junction 53 within about ± 0.001 volts of the speed voltage analog signal available from the comparator 31 of the inverter stage 29.

Further, the ramp signal available at the junction 53 and representative of a pseudo-ideal rate of vehicle deceleration is reversed in polarity by the potential inverting means 61 and applied via the voltage divider circuit 77 to the comparator 23. Moreover, the potential inverting means 61 tends to isolate the brake control circuitry 27 from the integrator circuit means 55 whereby loading variations of the brake control circuit 27 do not deleteriously affect the operation.

Additionally, the switching means 79 serves to selectively introduce impedance into the integrator circuit means 55 whereby a change in the slope of the ramp signal is effected. Moreover, this slope change is dependent upon the logic information available at the logic rail 15 and derived from the deceleration acceleration and differential wheel speed means, 11, 17 and 21 respectively.

Figure 3:
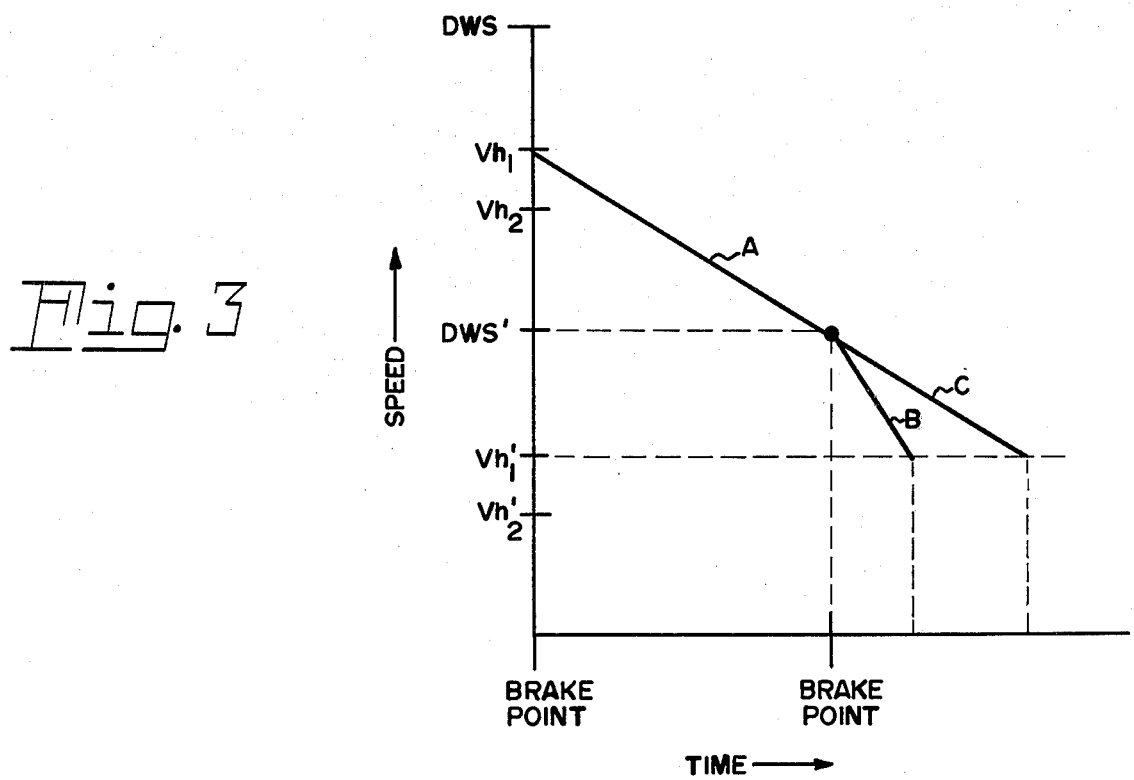
FIG. 3 is a speed-time graph to assist in the explanation of the illustration of FIG. 2.

Referring to FIG. 3 for a more specific illustration, it may be assumed that the differential wheel speed (DWS) is designed to be of a speed greater than the speed of either one of the wheels of a vehicle. Thus, we have a differential wheel speed value DWS on the speed-time graph. Also, a high wheel speed $V_{h1}$ and a slower wheel speed $V_{h2}$ are present at a given brake point.

Upon application of the brakes, the differential wheel speed DWS will drop to a given value DWS' and the high and slower wheel speeds $V_{h1}$ and $V_{h2}$ will also immediately decrease to values $V_{h1}'$ and $V_{h2}'$ for example. At this time, the theoretical vehicle speed, Curve A, will be decreased until the theoretical vehicle speed is equal to the decreased value of differential wheel speed DWS'.

When the decreased differential wheel speed DWS' and the theoretical vehicle speed, Curve A, are substantially equal, the output from the comparator 23 applied to the brake control means 27 will be altered and the brakes applied to the vehicle. If the acceleration and deceleration information available at the logic rail 15 indicates that both wheels of the vehicle are behaving in a normal and desirable manner, the logic information will activate the switching means 79. Thereupon, the impedance and time constant of the integrator circuit means 55 will be altered and the slope representing the theoretical vehicle speed, Curve A, will be altered to an increased value, Curve B.

However, should the logic information available at the logic rail 15 indicate that the wheels or vehicles are decelerating at unequal rates or not behaving in a normal or desirable manner, the switching means 79 will not be activated. Thereupon, the theoretical vehicle speed, Curve A, will continue at a similar slope, Curve C, and a secondary or dual slope ramp, Curve B, will not be introduced.

Thus, there has been provided a unique dual slope ramp circuit for an anti-skid control system. This circuitry eliminates numerous problems associated with unmatched transistors subject to temperature drift variations. Also, the circuitry provides a system for regulating the energy supplied to a passive integrator circuit without draining the energy from the speed indicating apparatus. Moreover, the system provides an economical system for selecting the slope desired while isolating the brake control system from the passive integrator circuitry.

While there has been shown and described what is at present considered the preferred embodiment of the invention, it will be obvious to those skilled in the art that various changes and modifications may be made therein without departing from the invention as defined by the appended claims.

What is claimed is:

1. In a wheeled vehicle anti-skid control circuit having first and second voltage sources representative of first and second wheel speeds; acceleration and deceleration means coupled to said first and second voltage sources and to a logic rail connected to a brake control means; and a differential wheel speed means coupled to the first and second voltage sources and by a comparator means to the logic rail and brake control means; an anti-skid control ciruit comprising:

passive integrator circuit means connected intermediate a potential source and a potential reference level and coupled to a comparator means;

switching means coupled to said logic rail and to said passive integrator circuit means for selective alteration of the impedance of said passive integrator circuit in accordance with signals on said logic rail; and potential regulator means having a comparator means with a non-inverter junction, an inverter junction, and an output coupled to said passive integrator cirucit means and by way of an impedance to said inverter junction and to said first and second voltage sources representative of said first and second wheel speeds, said potential regulator means effecting control of the energy supplied to said passive integrator circuit from said potential source in accordance with the potential provided by one of said first and second voltage sources.

2. In a wheeled vehicle anti-skid control circuit having first and second voltage sources representative of first and second wheel speeds; acceleration and deceleration means coupled to said first and second voltage sources and to a logic rail connected to a brake control means; and a differential wheel speed means coupled to the first and second voltage sources and by a comparator means to the logic rail and brake control means; an anti-skid control circuit comprising:

passive integrator circuit means connected intermediate a potential source and a potential reference level;

potential inverting means including a high impedance circuit means DC coupling said passive integrator circuit means to said comparator means connected to said logic rail and brake control means;

switching means coupled to said logic rail and to saiid passive integrator circuit for selective alteration of the impedance of said passive integrator circuit in accordance with signals on said logic rail; and potential regulator means coupled to said passive integrator circuit means and to said first and second voltage sources representative of said first and second wheel speeds, said potential regulator means effecting control of the energy supplied to said passive integrator circuit from said potential source in accordance with the potential provided by one of said first and second voltage sources.

3. A dual slope ramp circuit for a wheeled vehicle anti-skid control circuit having first and second voltage sources representative of first and second wheel speeds; logic rail and brake control means; acceleration and deceleration means coupling the first and second voltage sources to the logic rail and brake control means; and differential wheel speed means coupled to the first and second voltage sources and to a comparator connected to the logic rail and brake control means; the dual slope ramp circuit comprising:
  inverter means coupled to said first and second voltage sources representative of first and second wheel speeds;
  potential regulator means coupled to said inverter means;
  passive integrator circuit means coupled to said potential regulator means and connected intermediate a potential source and a potential reference level, said passive integrator circuit means developing a signal for providing a ramp signal representative of a theoretical vehicle speed;
  potential inverter means coupling said passive integrator circuit means to said comparator means coupled to said logic rail and brake control means; and
  switching means coupled to said logic rail and brake control means and to said passive integrator circuit means, said switching means altering the energy applied from said passive integrator circuit means to said comparator means in accordance with the potential representing wheel speed received from said logic rail whereby said ramp signal representative of a theoretical vehicle speed is altered in accordance with a potential representive of wheel speed.

4. The dual slope ramp circuit of claim 3 wherein said potential regulator means is in the form of a comparator circuit having a non-inverting junction coupled to said inverter means, an output coupled to said passive integrator circuit means and by way of an impedance to an inverting junction.

5. The dual ramp circuit of claim 3 wherein said potential inverter means includes isolating impedance means DC coupling said passive integrator circuit means to said comparator means.

* * * * *

UNITED STATES PATENT OFFICE
CERTIFICATE OF CORRECTION

PATENT NO. : 3,924,903
DATED : December 9, 1975
INVENTOR(S) : Lucian F. Emerson

It is certified that error appears in the above-identified patent and that said Letters Patent are hereby corrected as shown below:

Column 1, line 22 - insert "speed" after "average" and before "of"

Column 1, line 30 - delete "of" and insert "to" after slope

Column 6, line 59 - delete "saiid" and insert "said"

Column 8, line 21 - insert "slope" after "dual" and before "ramp"

Signed and Sealed this twenty-third Day of March 1976

[SEAL]

Attest:

RUTH C. MASON
Attesting Officer

C. MARSHALL DANN
Commissioner of Patents and Trademarks